H. H. HUNT.
VEHICLE SIGNAL.
APPLICATION FILED MAR. 3, 1919.

1,396,212.

Patented Nov. 8, 1921.
2 SHEETS—SHEET 1.

Inventor
Herbert H. Hunt

By Harry C. Schroeder
Attorney

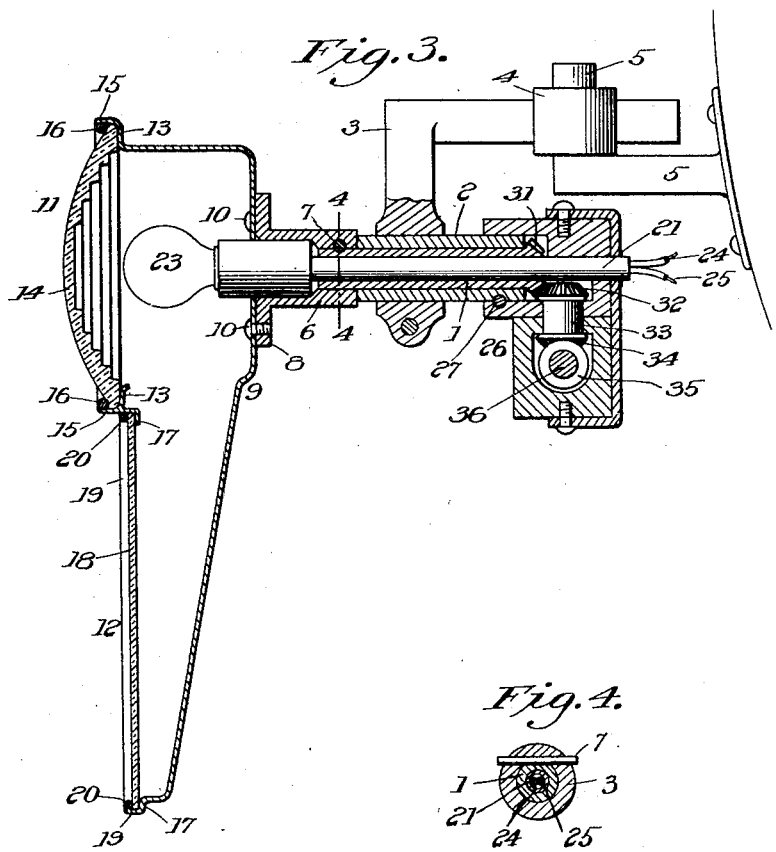

UNITED STATES PATENT OFFICE.

HERBERT H. HUNT, OF OAKLAND, CALIFORNIA.

VEHICLE-SIGNAL.

1,396,212.      Specification of Letters Patent.      Patented Nov. 8, 1921.

Application filed March 3, 1919. Serial No. 280,309.

*To all whom it may concern:*

Be it known that I, HERBERT H. HUNT, a citizen of the United States, residing at Oakland, in the county of Alameda and State of California, have invented certain new and useful Improvements in Vehicle-Signals, of which the following is a specification.

This invention is an improved automobile signal. The signal includes the automobile tail lamp, but the light maintains its normal position at all times while the signal indicator changes its position to indicate the various maneuvers of the automobile.

This invention is illustrated in the accompanying drawings which form a part of this specification and the appended claims.

Referring to the drawing:

Fig. 3 is an enlarged longitudinal section of the signal.

Fig. 4 is a cross section on line 4—4 of Fig. 3.

Figure 1:
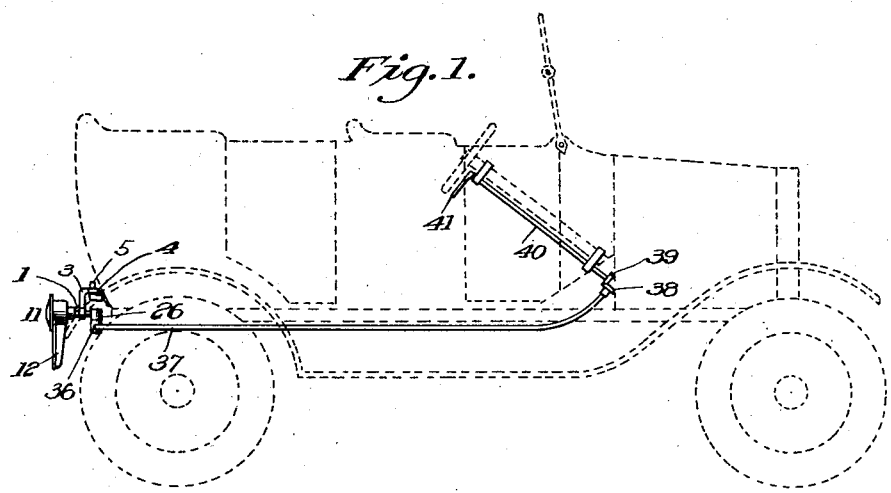
Figure 1 is a side elevation of the signal applied to an automobile, the automobile being shown in broken lines.
Figure 2:
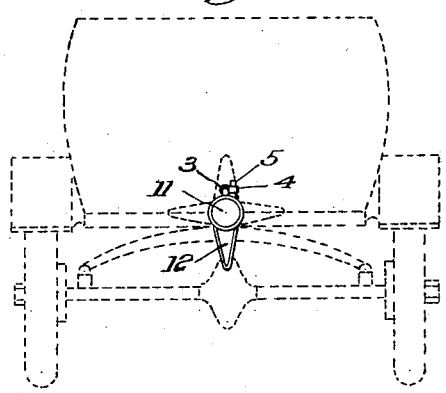
Fig. 2 is a rear view of the invention as shown in Fig. 1.

In the drawings, 1 indicates a hollow shaft journaled in a bearing 2 suspended on an elbow 3 on which is secured an eye member 4 which fits on a bracket 5 secured to the rear of an automobile body. A collar 6 is secured on the rear end of the shaft 1 by a pin 7 and has a rear flange 8 to which a casing 9 is secured by screws 10. The casing 9 forms the casing of the tail lamp 11 arranged axially with shaft 1 and an indicator 12 extending radially from the center of the tail lamp. The casing 11 is formed with a circular offset 13, central with the shaft 1 upon which rests the red glass 14 of the tail lamp, and with a flange 15 extending outwardly from said offset and turned slightly inwardly for engaging a spring ring 16 to hold the glass 14 in position on the lamp casing. The casing 9 has an offset 17 at the rear edge of the indicator 12 upon which rests a white glass 18, and with a flange 19 extending outwardly from said offset and turned in to engage a wire spring frame 20 to hold the glass 18 in position on the indicator. A sleeve 21 extends through the hollow shaft 1 and a lamp socket 22 is secured on the rear end of said shaft within the collar 6 which holds an electric lamp 23. Insulated wires 24 and 25 connected to the terminals of said socket extend through sleeve 21 to a battery or other source of electrical energy not shown.

The casing 9 is open between the tail lamp and the indicator so that the light of the lamp projects into and outwardly through the rear of the indicator. The interior of the indicator is white, conforming to the glass 18 so that a white light is projected from the indicator to distinguish it from the red tail light.

On the forward end of the bearing 2 a swivel joint 26 is secured by means of pin 27. The forward end of shaft 1 extends into said joint and has a beveled pinion 31 secured thereon which meshes with a beveled pinion 32 on the upper end of a vertical shaft 33 journaled in said joint. On the lower end of said vertical shaft 33 is secured a beveled pinion 34 which meshes with a beveled pinion 35 on the inner end of a horizontal shaft 36 journaled in the swivel joint 26 and extending outwardly therefrom. To the outer end of shaft 36 is secured the rear end of a flexible shaft 37 which extends forwardly under the automobile body to the lower end of the automobile steering post. A beveled pinion 38 is secured on the forward end of shaft 37 and meshes with a beveled pinion 39 secured on the lower end of shaft 40 journaled on the steering post of the automobile. An arm 41 is secured to the upper end of the shaft 40 under the steering wheel for operating the signal.

Normally the signal rests in neutral position with the indicator 12 extending downwardly. Upon turning the arm 41 partly to the right the signal is turned, through the medium of shaft 40, beveled pinions 39 and 38, shafts 37 and 36, beveled pinions 35 and 34, vertical shaft 33, beveled pinions 32 and 32 and shaft 1 so that the indicator 12 points to the right, indicating that the automobile is about to turn to the right. Upon turning the handle 41 partly to the left the signal is turned as described so that the indicator 12 points to the left indicating that the automobile is about to turn to the left. Upon turning the handle 41 all the way in either direction the signal is turned until the indicator points upwardly in a vertical direction indicating that the automobile is going to stop. Upon removing pins 7 and 27 the signal may be taken apart.

Having described my invention, I claim as new:

1. A vehicle signal including a bearing mounted horizontally on the rear of the vehicle, a horizontal shaft journaled in said bearing, a tail lamp secured on the rear end of said shaft, an indicator extending from said tail lamp through which indicator the light of said tail lamp projects, a swivel joint secured on the forward end of said shaft, a bevel gear on the forward end of said shaft, a vertical shaft journaled in said swivel joint, a bevel gear on the upper end of said vertical shaft meshing with the bevel gear on said first shaft, a third shaft journaled in said swivel joint, a bevel gear on the lower end of said vertical shaft, a bevel gear on the inner end of said third shaft meshing with the bevel gear on the lower end of said vertical shaft, a flexible shaft connected to the outer end of said third shaft, and means on the front of the vehicle for turning said flexible shaft to rotate said tail lamp and indicator.

2. A vehicle signal including a bearing mounted horizontally on the rear of the vehicle, a horizontal shaft journaled in said bearing, a collar fitting on the rear end of said shaft, a pin extending through said collar and through a groove in said shaft for detachably holding said collar on said shaft, a tail lamp secured on said collar, an indicator extending from said tail lamp through which the light of said lamp projects, a swivel joint on the forward end of said bearing, a pin extending through said joint and a groove in said bearing for detachably holding said joint on said bearing, a bevel gear on the forward end of said shaft in said joint, a vertical shaft in said joint, a bevel gear on the upper end of said vertical shaft meshing with the bevel gear on the forward end of said shaft, a bevel gear on the lower end of said vertical shaft, a third shaft journaled in said joint, a bevel gear on the inner end of said third shaft meshing with the bevel gear on the lower end of said vertical shaft, and a flexible shaft secured to the outer end of said third shaft, and means on the front of the vehicle for rotating said flexible shaft.

3. In combination, a bracket secured on the rear of a vehicle, an elbow, an eye on one member of said elbow fitting on said bracket, a bearing suspended in the other member of said elbow, a shaft journaled in said bearing, a tail lamp secured on the rear end of said shaft, an indicator on said lamp, and means for rotating said shaft to rotate said lamp and indicator into different signaling positions.

In testimony whereof I hereunder affix my signature.

HERBERT H. HUNT.